United States Patent Office 2,780,343
Patented Feb. 5, 1957

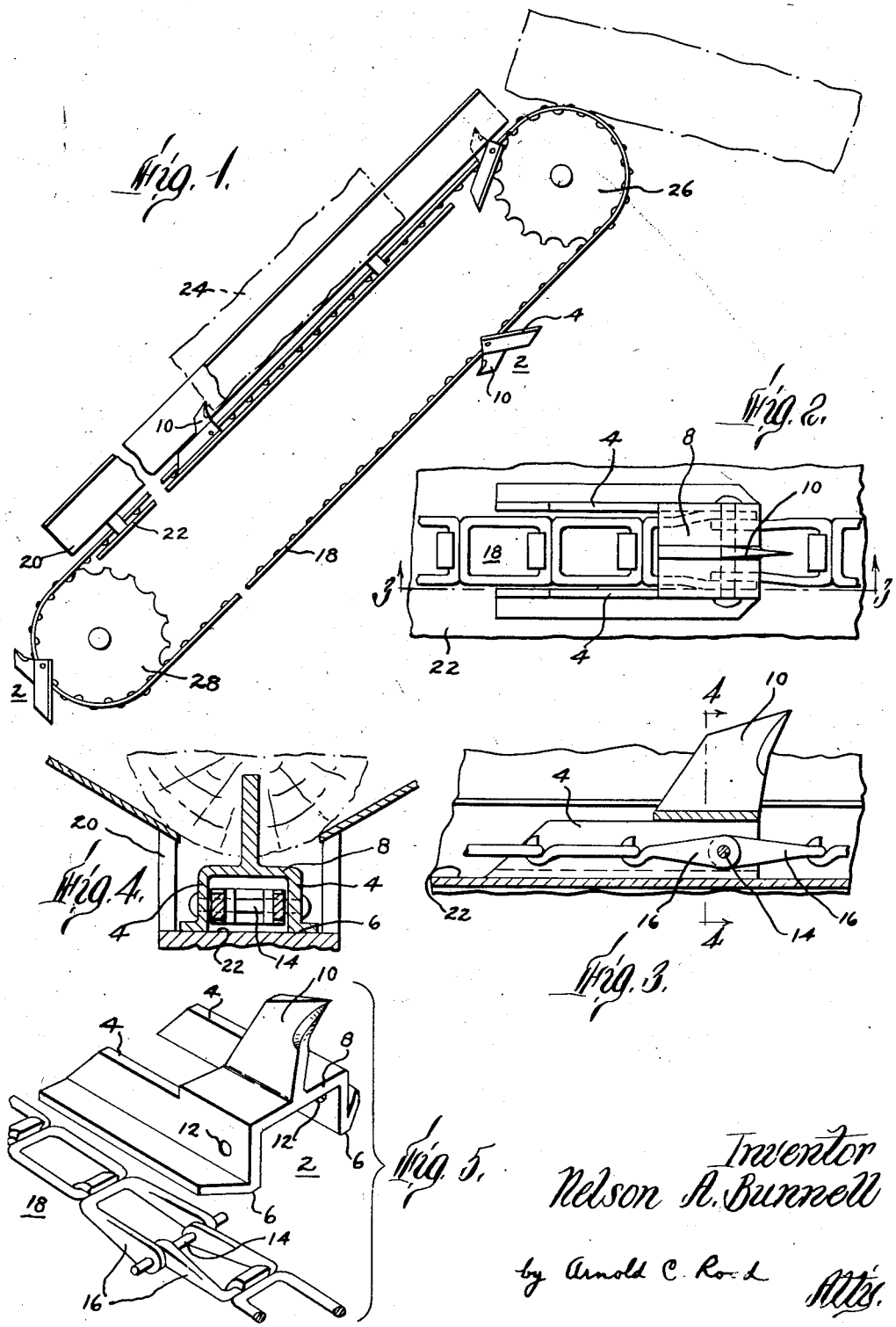

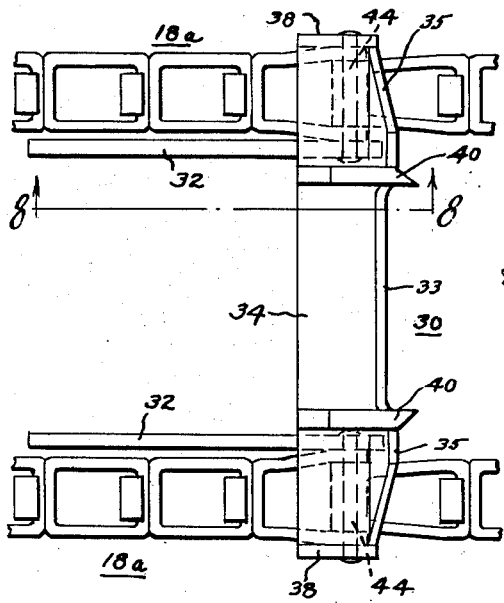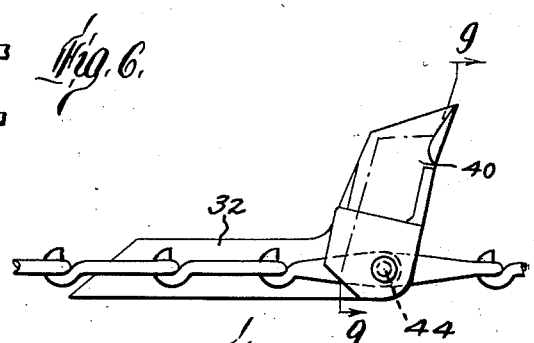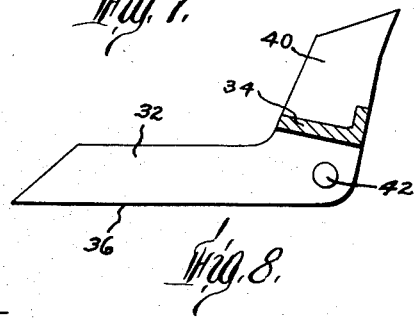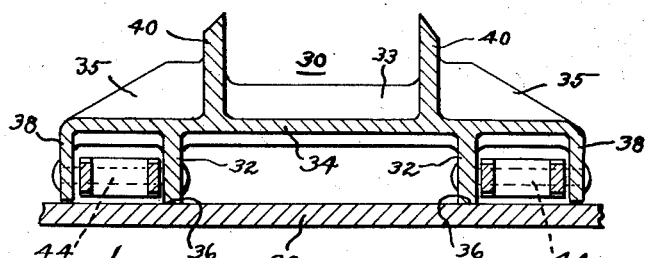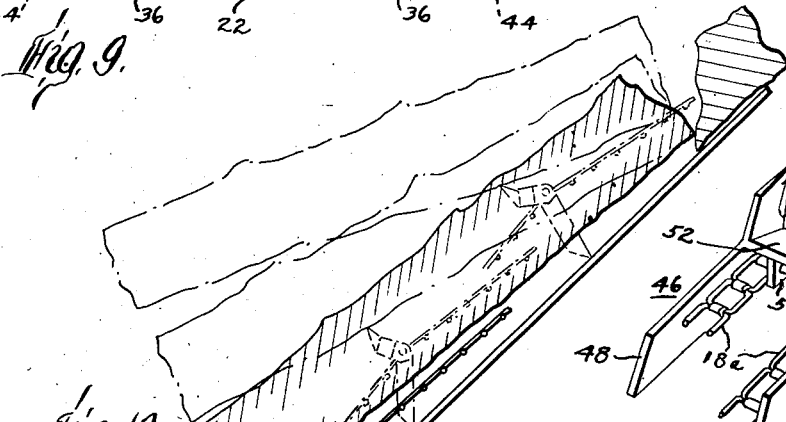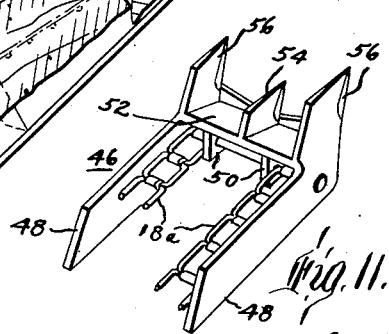

2,780,343

CONVEYOR CONSTRUCTION

Nelson A. Bunnell, South Canaan, Vt.

Application February 24, 1953, Serial No. 338,437

2 Claims. (Cl. 198—170)

This invention relates to conveyors, and more particularly to chain conveyors and dog constructions therefor.

Objects of the invention are to provide an improved conveyor dog and chain conveyor construction for use in the conveying of logs and the like. A further object is to provide an improved construction for inclined conveyors.

In view of the above and other objects, there is provided by this invention a conveyor dog having a pair of spaced parallel longitudinally extending leg members. A bridge member rigidly secures together said leg members, at their forward portions only, and well above the lower surfaces of the leg members. The dog carries one or more forwardly facing prongs. The leg members are constructed and arranged at their forward portions for pivotal connection about a transverse axis to a conveyor chain. A chain, with a dog or dogs of this invention pivotally connected thereto, is arranged to move longitudinally over a flat bottom portion of a conveyor trough with the leg members of the dogs arranged to slide on said bottom portion of the conveyor trough.

The invention further contemplates a conveyor construction embodying a pair of spaced parallel conveyor chains, and a dog constructed and arranged for association with said pair of chains.

In the drawings:

Figure 1 is a side view of an inclined conveyor showing conveyor dogs of this invention associated with a conveyor chain;

Fig. 2 is a fragmentary plan view showing a conveyor dog of this invention associated with a conveyor chain and disposed on the bottom of a conveyor trough;

Fig. 3 is a longitudinal vertical section taken on line 3—3 of Fig. 2;

Fig. 4 is a transverse vertical section taken on line 4—4 of Fig. 3;

Fig. 5 is an exploded perspective view of the conveyor dog shown in Figs. 1 to 4 inclusive and a chain to which the dog may be pivotally connected;

Fig. 6 is a plan view of another embodiment of conveyor dog in accordance with this invention shown in association with a pair of conveyor chains;

Fig. 7 is a side elevation of the construction shown in Fig. 6;

Fig. 8 is a vertical section taken on line 8—8 of Fig. 6;

Fig. 9 is a transverse section on line 9—9 of Fig. 7, showing also a bottom portion of a conveyor trough;

Fig. 10 is a side elevation illustrating the action of a conveyor dog of this invention in the event of the jamming of logs being conveyed; and Fig. 11 is a perspective view of another embodiment of conveyor dog associated with a pair of conveyor chains.

In the embodiment of the invention illustrated in Figs. 1 to 5 inclusive and 10, a conveyor dog 2 is shown, having a pair of spaced parallel longitudinally extending leg members 4. The leg members 4 are rigidly secured together, at their forward portions only, and well above the lower surfaces 6 of the leg members, by bridge member 8.

The dog 2 carries a forwardly facing prong. As illustrated, there is carried by bridge member 8 a prong 10, which is shown as extending upwardly and forwardly of the bridge member 8. The leg members 4 are preferably relatively long with respect to the height of the prong 10 above the lower surfaces 6 of the leg members.

At their forward portions, the leg members 4 of the dog are pivotally connected about a transverse axis to a chain. As illustrated, the leg members 4 are provided at their forward portions with transversely aligned apertures 12, which are arranged to receive pivot pin 14 passing through coupler links 16 of chain 18, the latter, as illustrated, being of the so-called "Ewart" detachable type. The pin 14 may be suitably headed, as illustrated in Fig. 4, to hold the construction in assembled position.

When the dog 2 is associated with the chain 18, it will be noted that the leg members 4 are disposed one on each side of the chain 18, and that the bridge member 8 overlies the chain 18 in spaced relation thereto. The latter feature permits substantial forward pivotal movement of the dog relative to the chain. The location of the bridge member 8 only at the forward portions of the leg members 4 permits extensive rearward pivotal movement of the dog 2 relative to the chain 18.

There is illustrated in Fig. 1 an inclined conveyor, details being shown in Figs. 2 to 5 inclusive. The conveyor has a trough 20 with a flat bottom portion 22. The conveyor chain 18 is shown as arranged to move longitudinally along the trough 20 with the bottom surfaces 6 of the leg members of the dogs 2 sliding on the bottom portion 22.

In Fig. 1, the prong 10 of one of the dogs 2 is shown as engaging the rearward end of a log 24 in the upward travel of the log. It will be noted that the rearward force exerted by the log on the prong 10 is imparted to the leg members 4 of the dog 2 so that the leg members 4 press downwardly on the trough bottom 22. Since this force is transmitted through the dog directly to the trough bottom, any backward twisting movement, or buckling action, on the chain is avoided. The consequence is that chains of lighter construction and less expensive character may be used when dogs of this invention are employed, and furthermore, likelihood of chain breakage is minimized.

In Fig. 1, the trough bottom 22 is shown as stopping short of the upper sprocket wheel 26 whereby the dog 2 may pivot rearwardly and disengage itself readily from a log with which it is engaged. The pivotal relation of free dogs to the chain is illustrated on the under side of the conveyor and adjacent to the lower sprocket wheel 28.

It will be understood, of course, that the prong of the dog may engage the log at any longitudinal portion thereof. Furthermore, if the log is longer than the distance between dogs, the log may be engaged by more than one dog.

In Fig. 10 is illustrated the functioning of the dog in the event of the jamming of the logs. As shown, in such case the dog 2 gradually rises and pivots rearwardly about the pivot pin 14, and passes underneath the jammed logs without causing any excessive strain on the chain 18 as by buckling or backward twisting movement.

In Figs. 6 to 9 inclusive is illustrated a modified construction according to this invention wherein the dog 30 is constructed and arranged to cooperate with a pair of spaced parallel conveyor chains 18a. The dog 30 is shown as having a pair of spaced parallel longitudinally extending leg members 32. Bridge member 34 rigidly secures together the leg members 32, at their forward portions only, well above the lower surface 36 of the leg members 32. A pair of depending sections 38 extend downwardly from bridge member 34, each adjacent to one of the leg members 32. Bridge member 34 carries a pair of forwardly extending prongs 40; as illustrated, prongs 40 are symmetrically disposed relative to the bridge member 34, and extend upwardly and forwardly thereof. Strengthening members 33 and 35 are carried by bridge member 34 and serve to stiffen the prong construction. Leg members 32 and depending sections 38 have transversely aligned apertures 42 which are disposed at the forward portions of leg members 32. Apertures 42 are arranged to receive pivot pins 44 for pivotal connection of the dog 30 to a pair of conveyor chains 18a. The pins 44 may be suitably headed, as shown.

As shown in Figs. 6 to 9, the leg members 32 are shown as disposed on the inner sides of the chains 18a, and the depending portions 38 on the outer sides of the chains. The leg members 32 are arranged to slide on the conveyor bottom 22 with the lower surfaces 36 of the leg members in contact with the conveyor bottom. The depending sections 38 need not extend downwardly into contact with the conveyor bottom, as illustrated in Fig. 9. Bridge member 24 overlies chains 18a in spaced relation thereto.

Conveyor dog 30 functions in a chain conveyor in the manner described above with respect to conveyor dog 2.

In Fig. 11 is shown a modified form of conveyor dog 46 arranged for association with a pair of conveyor chains. The dog 46 is generally similar to dog 30, but in dog 46, the leg members 48 are on the outer sides of the chains 18a, and the depending sections 50 are on the inner sides of the chains 18a. Furthermore, the bridge member 52 is shown as carrying a small centrally disposed prong 54, useful for small logs, and two larger laterally disposed prongs 56. Furthermore, a single pivot pin cooperates with both chains and extends transversely of the entire dog between leg members 48.

In conveyor dogs according to the present invention, it will be understood that the lower surfaces of the leg members may be wide, as in Fig. 5, or relatively narrow, as in Figs. 9 and 11. Generally speaking, the leg members are relatively long with relation to the height of the prongs above the lower surface of the leg members. This ratio may vary, however, and the steeper the incline of the conveyor, the longer are the leg members relative to the height of the prongs. For a conveyor having a 45° incline, a ratio of 2 to 1 is satisfactory.

The conveyor dog may carry one or more prongs, as appears convenient or desirable. The prongs conveniently are carried by the bridge member, but may also be carried by leg members.

The conveyor dogs may be made of any suitable material, but conveniently and preferably are made of steel. The dogs may be made from a plurality of pieces, rigidly secured together, as by welding.

The invention advantageously may be employed in the loading or stacking of pulpwood, or in any other conveying of wood or other materials.

The invention is advantageously employed in connection with chains having detachable links, because chain sections containing dogs which may have become broken or worn may be replaced without the use of any tools. However, the invention contemplates the use of any other suitable type of chain.

It will be seen that there is provided by this invention chain conveyor and conveyor dog constructions of simple and economical character, and which function with a maximum of effectiveness and with a minimum of operating difficulty.

It will be understood that various changes and modifications may be made while still coming within the scope of the invention as defined in the claims.

What I claim is:

1. In a chain conveyor, in combination, a longitudinally extending conveyor chain two adjacent coupler links of which are arranged to receive a transverse pivot pin; a conveyor dog comprising a pair of laterally spaced, parallel, longitudinally extending leg members arranged to slide on the bottom of a conveyor trough and to receive a chain therebetween; a bridge member connecting the forward portions of said leg members well above the lower surfaces of said leg members, the space between said leg members rearwardly of said bridge being open; said dog carrying at least one prong extending upwardly and forwardly from said bridge; said leg members being relatively long with respect to the heights of said prong above the lower surfaces of said leg members; said leg members being apertured in transverse alignment at the forward ends of the leg members, spaced from the lower surfaces thereof only sufficiently to allow the lower surfaces of the chain at the pivot area to be carried slightly above the lower surfaces of the leg members; and a pivot pin pivotally connecting said coupler links to each other and to the said dog through said apertures, whereby said dog may pivot around the axis of said pin.

2. In a chain conveyor, in combination, a pair of spaced longitudinally extending conveyor chains two adjacent coupler links of each of which are arranged to receive transverse pivotal connecting pin means; a conveyor dog comprising a pair of laterally spaced, parallel, longitudinally extending leg members arranged to slide on the bottom of a conveyor trough; a bridge member connecting the forward portions of said leg members well above the lower surfaces of said leg members, the space between said leg members rearwardly of said bridge being open; said dog carrying a centrally disposed prong extending upwardly and forwardly from said bridge, and further carrying a pair of laterally disposed prongs extending forwardly and upwardly of said centrally disposed prong; said leg members being relatively long with respect to the heights of said prongs above the lower surfaces of said leg members; a pair of depending sections extending downwardly from said bridge member between said leg members, each depending section being laterally spaced from a leg member to receive coupler links of a chain therebetween; said leg members and depending sections being apertured in transverse alignment at the forward ends of the leg members and spaced from the lower surfaces thereof only sufficiently to allow the lower surfaces of the chains at the pivot area to be carried slightly above the lower surfaces of the leg members; and pin means pivotally connecting the coupler links of each chain to each other and to said dog through said apertures, whereby said dog may pivot around the axis of the pin means.

References Cited in the file of this patent

UNITED STATES PATENTS

| | | |
|---|---|---|
| 124,130 | Grier | Feb. 27, 1872 |
| 207,267 | Gleason | Aug. 20, 1878 |
| 846,468 | Hancock | Mar. 12, 1907 |
| 1,214,290 | Fisher | Jan. 30, 1917 |
| 1,593,501 | Martin et al. | July 20, 1926 |
| 1,759,709 | Peterson | May 20, 1930 |
| 1,822,797 | Birmann | Sept. 8, 1931 |
| 2,580,786 | Jewett et al. | Jan. 1, 1952 |